US012777310B2

(12) United States Patent
Jia et al.

(10) Patent No.: US 12,777,310 B2
(45) Date of Patent: Oct. 27, 2026

(54) TRACKING AND PROTECTING LOST OR STOLEN MOBILE DEVICES VIA A DEDICATED NETWORK SLICE

(71) Applicant: AT&T Intellectual Property I, L.P., Atlanta, GA (US)

(72) Inventors: Yupeng Jia, South Pasadena, CA (US); Rashmi Palamadai, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 225 days.

(21) Appl. No.: 18/821,640

(22) Filed: Aug. 30, 2024

(65) Prior Publication Data

US 2026/0067639 A1 Mar. 5, 2026

(51) Int. Cl.
*H04W 4/029* (2018.01)

(52) U.S. Cl.
CPC .................................. *H04W 4/029* (2018.02)

(58) Field of Classification Search
CPC . H04W 12/126; H04W 12/082; H04W 12/63; H04W 4/029; H04W 12/02; H04W 12/03; H04W 12/12; H04W 12/08; H04W 4/02; H04W 64/00; H04W 12/06; H04W 12/30; H04W 12/64; G06F 21/88; G06F 2221/2111

See application file for complete search history.

(56) References Cited

U.S. PATENT DOCUMENTS

2007/0093243 A1* 4/2007 Kapadekar ........ H04M 3/42178 455/419
2017/0041749 A1* 2/2017 Dowlatkhah ......... H04L 63/102
2025/0005211 A1* 1/2025 Kuravangi-Thammaiah ............... G06F 21/53
2025/0081085 A1* 3/2025 Kuravangi-Thammaiah ............... H04L 41/0823

* cited by examiner

*Primary Examiner* — Allahyar Kasraian
(74) *Attorney, Agent, or Firm* — Guntin & Gust, PLC; Andrew Gust

(57) ABSTRACT

In one example, a method includes receiving a report indicating that a mobile device has been lost or stolen, sending, in response to the report, an instruction to the mobile device that causes the mobile device to connect to a network slice that is dedicated for protecting and tracking lost and stolen mobile devices, sending, in response to determining that the mobile device has connected to the network slice, a second instruction to the mobile device that causes the mobile device to modify a setting of the mobile device to limit a functionality of the mobile device and to permit tracking of the mobile device, receiving, via the network slice, a message from the mobile device indicating a current physical location of the mobile device, and reporting the current physical location of the mobile device.

20 Claims, 4 Drawing Sheets

TRACKING AND PROTECTING LOST OR STOLEN MOBILE DEVICES VIA A DEDICATED NETWORK SLICE

The present disclosure relates generally to mobile communications networks, and relates more particularly to devices, non-transitory computer-readable media, and methods for tracking and protecting lost or stolen mobile devices via a dedicated network slice.

BACKGROUND

Mobile devices (e.g., smart phones, tablet computers, wearable devices, connected vehicles, and the like) are often used to engage with network connected applications, such as streaming music and video applications, gaming applications, and others. Different applications have different requirements for uplink and downlink latency, throughput, and packet loss rates depending on quality of experience (QoE) targets and/or other performance requirements.

A "network slice" is a set of network resources that collectively provides an end-to-end network that is tailored to fulfill specific performance requirements. For instance, a plurality of network slices may be configured, where each network slice may provide different performance with respect to one or more key performance indicators (or "KPIs," e.g., throughput, latency, packet loss, etc.). Network slices may also be configured to address the needs of specific applications or types of applications (e.g., providing high upload speeds for streaming high bitrate video, providing encryption for the transmission of sensitive data such as data streams generated by health monitoring sensors, etc.). In 5th generation (5G) mobile networks, a "network slice" is understood to refer even more specifically to a protected channel for one or more devices to privately communicate with a radio access network (RAN).

SUMMARY

In one example, the present disclosure describes a device, computer-readable medium, and method for tracking and protecting lost or stolen mobile devices via a dedicated network slice. For instance, in one example, a method performed by a processing system including at least one processor includes receiving a report indicating that a mobile device has been lost or stolen, sending, in response to the report, an instruction to the mobile device that causes the mobile device to connect to a network slice that is dedicated for protecting and tracking lost and stolen mobile devices, sending, in response to determining that the mobile device has connected to the network slice, a second instruction to the mobile device that causes the mobile device to modify a setting of the mobile device to limit a functionality of the mobile device and to permit tracking of the mobile device, receiving, via the network slice, a message from the mobile device indicating a current physical location of the mobile device, and reporting the current physical location of the mobile device.

In another example, a non-transitory computer-readable medium stores instructions which, when executed by a processing system, including at least one processor, cause the processing system to perform operations. The operations include receiving a report indicating that a mobile device has been lost or stolen, sending, in response to the report, an instruction to the mobile device that causes the mobile device to connect to a network slice that is dedicated for protecting and tracking lost and stolen mobile devices, sending, in response to determining that the mobile device has connected to the network slice, a second instruction to the mobile device that causes the mobile device to modify a setting of the mobile device to limit a functionality of the mobile device and to permit tracking of the mobile device, receiving, via the network slice, a message from the mobile device indicating a current physical location of the mobile device, and reporting the current physical location of the mobile device.

In another example, a device includes a processing system including at least one processor and a computer-readable medium storing instructions which, when executed by the processing system, cause the processing system to perform operations. The operations include receiving a report indicating that a mobile device has been lost or stolen, sending, in response to the report, an instruction to the mobile device that causes the mobile device to connect to a network slice that is dedicated for protecting and tracking lost and stolen mobile devices, sending, in response to determining that the mobile device has connected to the network slice, a second instruction to the mobile device that causes the mobile device to modify a setting of the mobile device to limit a functionality of the mobile device and to permit tracking of the mobile device, receiving, via the network slice, a message from the mobile device indicating a current physical location of the mobile device, and reporting the current physical location of the mobile device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
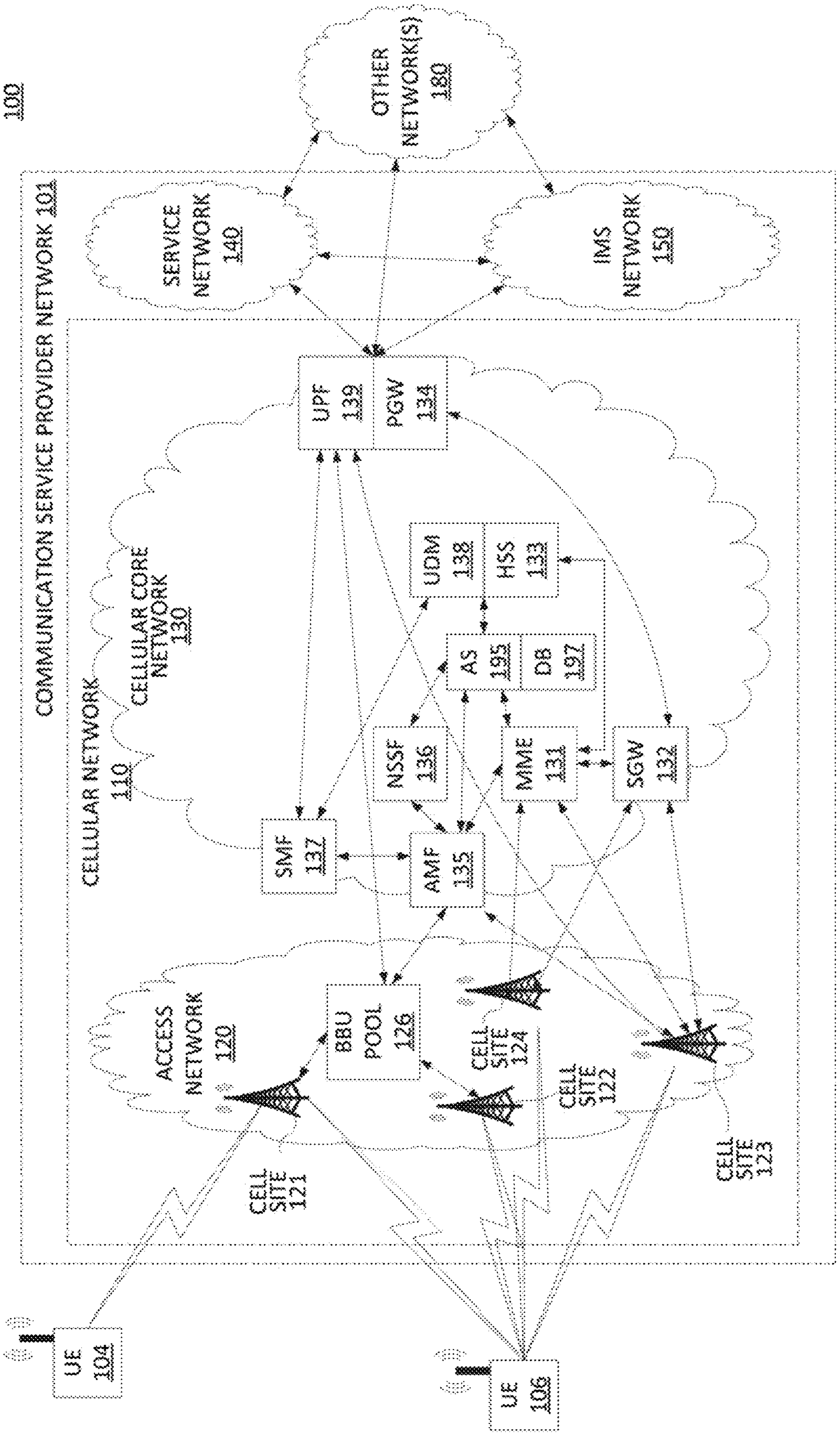
FIG. 1 illustrates an example network, or system, in which examples of the present disclosure may operate.

In one example, the present disclosure allows lost or stolen mobile devices to be tracked and protected via a dedicated network slice. As discussed above, a "network slice" is a set of network resources that collectively provides an end-to-end network that is tailored to fulfill specific performance requirements. For instance, a plurality of network slices may be configured, where each network slice may provide different performance with respect to one or more key performance indicators (or "KPIs," e.g., throughput, latency, packet loss, etc.). Network slices may also be configured to address the needs of specific applications or types of applications (e.g., providing high upload speeds for streaming high bitrate video, providing encryption for the transmission of sensitive data such as data streams generated by health monitoring sensors, etc.).

In 5th generation (5G) mobile networks, a "network slice" is understood to refer even more specifically to a protected channel for one or more devices to privately communicate with a radio access network (RAN). Thus, although "network slice" or simply "slice" is a term of art within the protocol definitions of 5G mobile networks, "network slice" as understood within the context of the present disclosure encompasses both the 5G usage and broader network configurations across protocols and usage.

According to examples of the present disclosure, some network slices may be dedicated for tracking and protecting lost or stolen mobile devices. The portable nature of mobile devices makes them vulnerable to being lost or misplaced, while the monetary value of the mobile devices (and, potentially, the information that may be stored on the mobile devices) makes the mobile devices attractive targets for theft. A consumer may spend hundreds or even thousands of dollars undoing the damage caused by a lost or stolen mobile device. For instance, a replacement mobile device may need to be purchased, fraud monitoring services may be purchased to ensure that an unauthorized user has not gained access to financial data (e.g., credit card numbers, bank account logins, mobile payment applications, etc.) or other types of confidential information stored on the lost or stolen mobile device, and money may be lost if an unauthorized user has successfully gained access to the financial data stored on the lost or stolen mobile device. Moreover, the consumer may spend a great deal of time setting up a replacement mobile device, resetting passwords, replacing credentials, and the like.

Examples of the present disclosure may assign a mobile device that has been reported as lost or stolen to a dedicated network slice that is configured to both protect and track the mobile device. In one example, once connected to the dedicated network slice, the mobile device may receive instructions to modify its settings, e.g., to reduce at least one functionality and/or disable one or more software applications (if still powered on) or to switch to an Internet of Things (IoT) mode to conserve power and enable tracking (if powered off). The modified settings may also cause the device to push notifications to devices in the dedicated network slice and/or to devices that are in close proximity (e.g., within short range wireless communication distance) to enable the location of the mobile device to be tracked.

In addition to sending instructions to the mobile device to modify its settings, devices in the dedicated network slice may track the mobile device (e.g., via the push notifications sent by the mobile device, via global positioning system signals, if enabled, or via other means). In further examples, the devices in the dedicated network slice may set an identifier associated with the mobile device (e.g., international mobile equipment identity) and/or a profile associated with a user of the mobile device to a protected mode that causes the information to be deleted from the mobile device (but stored off the mobile device for reactivation upon recovery or replacement of the mobile device). These and other aspects of the present disclosure are described in greater detail below in connection with the examples of FIGS. 1-4.

FIG. 1 illustrates an example network, or system, 100 in which examples of the present disclosure may operate. In one example, the system 100 includes a communication service provider network 101. The communication service provider network 101 may comprise a cellular network 110 (e.g., a 5G network, a 4G/Long Term Evolution (LTE)/5G hybrid network, or the like), a service network 140, and an IP Multimedia Subsystem (IMS) network 150. The system 100 may further include other networks 180 connected to the communication service provider network 101.

In one example, the cellular network 110 comprises an access network 120 and a cellular core network 130. In one example, the access network 120 comprises a radio access network (RAN), such as a cloud RAN, a distributed RAN (D-RAN), a centralized RAN (C-RAN), a virtualized RAN (V-RAN), or an open RAN (O-RAN). For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs) or radio units (RUs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as MIMO antennas, and millimeter wave antennas.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126. In one example, baseband unit functionality may be split into a centralized unit (CU) and a distributed unit (DU). In addition, the CU and the DU may be physically separate from one another. For instance, a DU may be situated with an RU/RRH at a cell site, while a CU may be in a centralized location hosting multiple CUs. Alternatively, or in addition, a single CU may serve multiple DUs and/or RUs/RRHs. In accordance with the present disclosure a "base station" may therefore comprise at least a BBU (e.g., in one example, a CU and/or a DU), and may further include at least one RRH/RU.

In another example, the access network 120 may comprise an O-RAN, and examples of the present disclosure for estimating network performance based on application synchronization signals may be deployed as an xApp in a RAN intelligent controller (RIC) of the O-RAN (i.e., a software tool used by the RIC to manage network functions in near-real time), close to a new radio (NR) component of the O-RAN.

Figure 4:
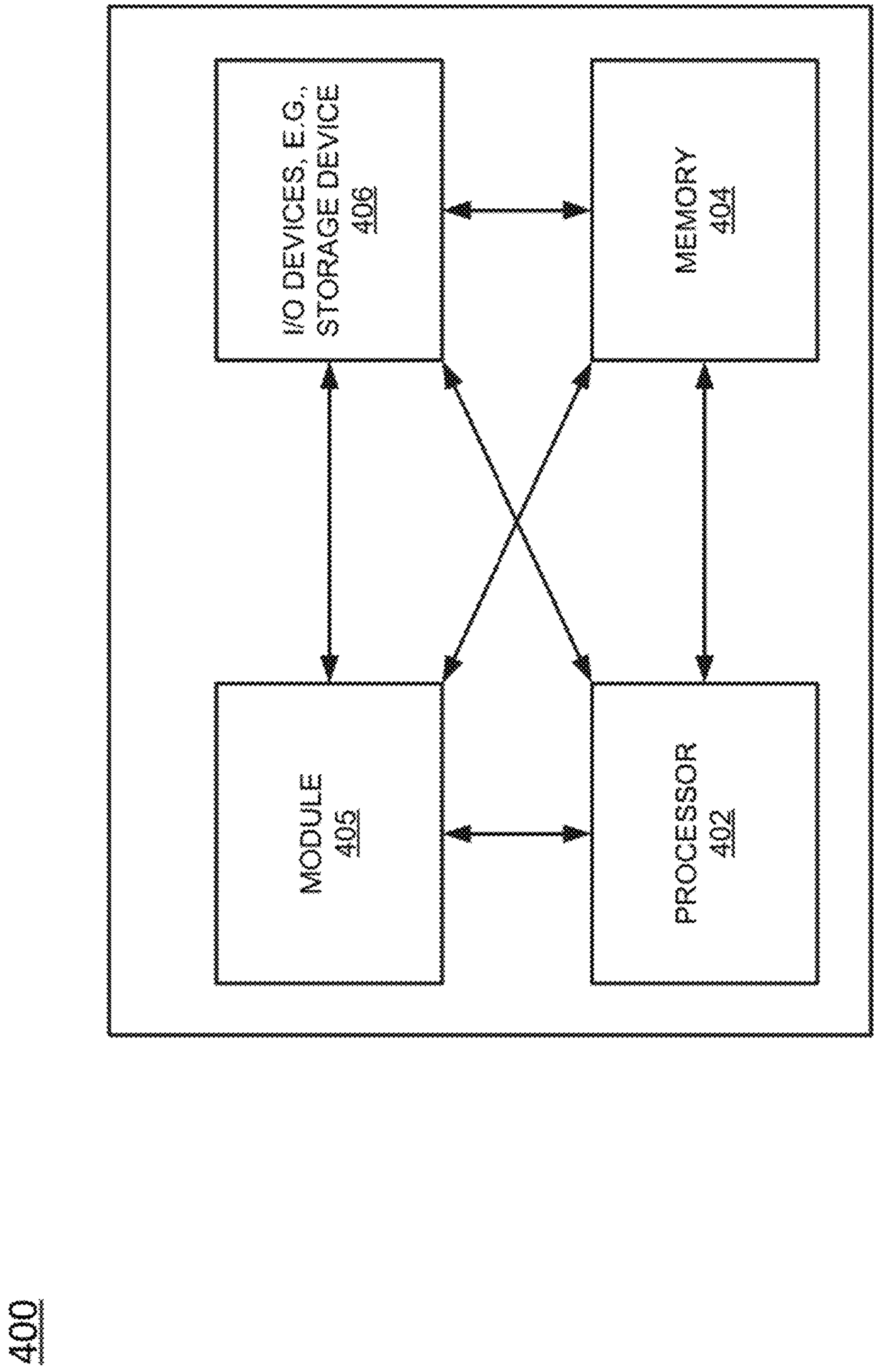
FIG. 4 depicts a high-level block diagram of a computing device specifically programmed to perform the functions described herein.

Any one or more of cell sites 121-123 may be deployed with antenna and radio infrastructures, including MIMO and millimeter wave antennas. Furthermore, a base station (e.g., cell sites 121-123 and/or baseband units within BBU pool 126) may comprise all or a portion of a computing system, such as computing system 400 as depicted in FIG. 4, and may be configured to provide information in connection with tracking and protecting lost or stolen mobile devices via a dedicated network slice.

In one example, access network 120 may include both 4G/LTE and 5G/NR radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network nodes such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 5G network components, 3G network components, etc. Thus, cellular core network 130 may comprise an integrated network, e.g., including any two or more of 2G-5G infrastructures and technologies (or any future infrastructures and technologies to be deployed, e.g., 6G), and the like. For example, as illustrated in FIG. 1, cellular core network 130 further comprises 5G components, including: an access and mobility management function (AMF) 135, a network slice selection function (NSSF) 136, a session management function (SMF) 137, a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, a fifth network slice may be utilized for lost and stolen devices, a sixth slice may be used for emergencies, and so forth.

In one example, SMF 137 may perform endpoint device IP address management, UPF selection, UPF configuration for endpoint device traffic routing to an external packet data network (PDN), charging data collection, quality of service (QoS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., a "5GC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure may also relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and/or users. For example, communication service provider network 101 may provide a cloud storage service, web server hosting, and other services. As such, service network 140 may represent aspects of communication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1. It should be noted that intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. Each of the UEs 104 and 106 may comprise a cellular telephone, a smartphone, a tablet computing device, a laptop computer, a pair of computing glasses, a wireless enabled wristwatch, a connected vehicle, a wireless transceiver for a fixed wireless broadband (FWB) deployment, an item of customer premises equipment, or any other cellular-capable mobile telephony and computing device (broadly, "an endpoint device"). The UEs 104 and 106 may be operated by subscribers of the cellular core network 130, subscribers of other cellular core networks, first responders, and/or other users.

In one example, each of the UEs 104 and 106 may comprise all or a portion of a computing system, such as computing system 400 depicted in FIG. 4, and may be configured to perform steps, functions, and/or operations in connection with examples of the present disclosure for tracking and protecting lost or stolen mobile devices via a dedicated network slice. In this regard, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

As illustrated in FIG. 1, UE 104 may access wireless services via the cell site 121 (e.g., NR alone, where cell site 121 comprises a gNB), while UE 106 may access wireless services via any of the cell sites 121-124 located in the access network 120 (e.g., for NR non-dual connectivity, for LTE non-dual connectivity, for NR-NR DC, for LTE-LTE DC, for EN-DC, and/or for NE-DC). For instance, in one example, UE 106 may establish and maintain connections to the cellular core network 130 via one or multiple gNBs (e.g., cell sites 121 and 122 and/or cell sites 121 and 122 in conjunction with BBU pool 126 and/or various other components, such as a CU and/or a DU). In another example, UE 106 may establish and maintain connections to the cellular core network 130 via a gNB (e.g., cell site 122 and/or cell site 122 in conjunction with BBU pool 126) and an eNodeB (e.g., cell site 124), respectively. In addition, either the gNB or the eNodeB may comprise a PCell, and the other may comprise a SCell for carrier aggregation and/or dual connectivity. Similarly, UE 106 may communicate with any of the cell sites 121 and 122 using carrier aggregation (CA) (e.g., in accordance with a CA technique). Furthermore, either or both of NR/5G and or EPC (4G/LTE) core network components may manage the communications between UE 106 and the cellular network 110 via cell site 122 and cell site 124.

In one example, the cellular core network 130 may further include an application server (AS) 195, which may comprise a computing system or server, such as computing system 400 depicted in FIG. 4, and may be configured to provide one or more operations or functions in connection with examples of the present disclosure for tracking and protecting lost or stolen mobile devices via a dedicated network slice. The cellular core network 130 may also include a database (DB) 197 that is communicatively coupled to the AS 195.

The AS 195 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the AS 195 may be configured to manage a dedicated network slice for protecting and tracking mobile devices that have been reported as lost or stolen. For instance, in some examples, the AS 195 may receive a notification indicating that a specific UE 104 or 106 has been reported as lost or stolen and may instruct the UE 104 or 106 to connect to the dedicated network slice. The network slice may provide a combination of device settings, network resources, and services designed to prevent the UE 104 or 106 from being used in a way that may be detrimental to the owner and to facilitate tracking and recovery of the UE 104 or 106. For instance, while the UE 104 or 106 is connected to the network slice, the AS 195 may instruct the UE 104 or 106 to modify certain settings to reduce a functionality, delete data, and/or ensure that location tracking cannot be disabled. The AS 195 may also collect data from the UE 104 or 106 and/or from other data sources (potentially including other devices or sensors in a vicinity of the UE 104 or 106) that may aid in tracking the physical location of the UE 104 or 106. The collected data may help the owner, a mobile communications service provider, and/or law enforcement authorities to recover the UE 104 or 106.

The DB 197 may store information about previous loss or theft situations that were resolved via the network slice, including optimal device settings of UE 104 or 106, optimal frequency band allocations, types of individuals to be alerted, types of instructions provided to the UE 104 or 106, types of data collected from the UE 104 or 106, and other data. This data may help the AS 195 to respond more optimally to similar situations in the future. In further examples, the DB may maintain a list of UEs that have been reported as lost or stolen and may share this information with a plurality of mobile communications service providers in order to prevent the UEs from being reactivated with new service providers as long as the UEs remain on the list.

In one example, the DB 197 may comprise a physical storage device integrated with the AS 195 (e.g., a database server or a file server), or attached or coupled to the AS 195, in accordance with the present disclosure. In one example, the AS 195 may load instructions into a memory, or one or more distributed memory units, and execute the instructions for tracking and protecting lost or stolen mobile devices via a dedicated network slice, as described herein. Example methods for tracking and protecting lost or stolen mobile devices via a dedicated network slice are described in greater detail below in connection with FIG. 2 and FIG. 3.

In one example, the cellular core network 130 may include multiple instances of the AS 195 and DB 197 distributed throughout the cellular core network 130, where the multiple instances each store identical data for the purposes of redundancy.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In one example, any one or more of the cell sites 121-123 may comprise 2G, 3G, 4G and/or LTE radios, e.g., in addition to 5G new radio (NR), or gNB functionality, or any future cellular technology, e.g., 6G and so on. For instance, cell site 123 is illustrated as being in communication with AMF 135 in addition to MME 131 and SGW 132. Thus, these and other modifications are all contemplated within the scope of the present disclosure.

Figure 2:
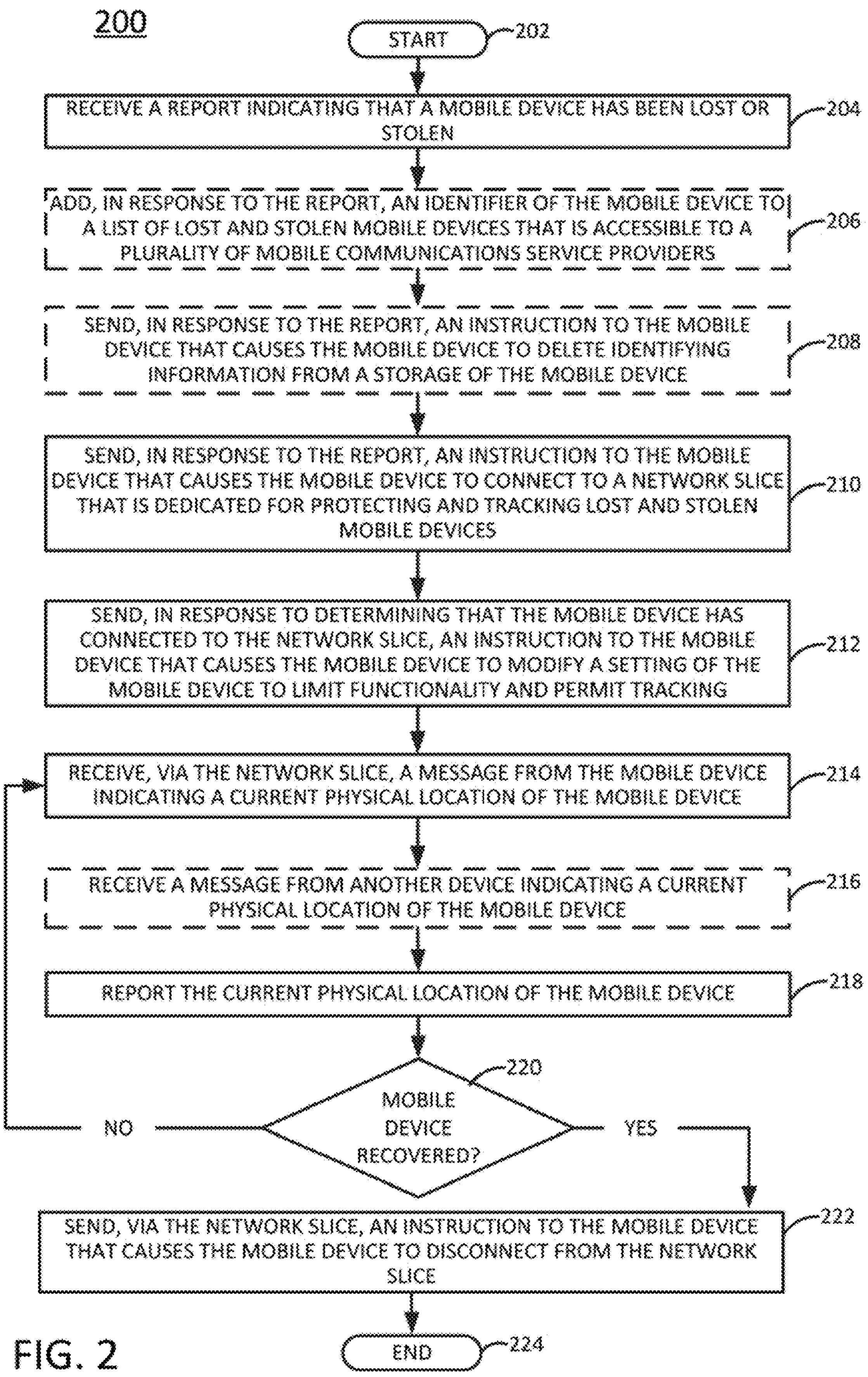
FIG. 2 illustrates a flowchart of an example method for tracking and protecting lost or stolen mobile devices via a dedicated network slice, in accordance with the present disclosure.

To further aid in understanding the present disclosure, FIG. 2 illustrates a flowchart of an example method 200 for tracking and protecting lost or stolen mobile devices via a dedicated network slice, in accordance with the present disclosure. In particular, the method 200 provides a method by which an application server responsible for managing a dedicated network slice that provides device, network, and service support for tracking and protecting lost and stolen devices may assist a mobile device that has been lost or stolen in connecting to the network slice. In one example, the method 200 may be performed by an application server responsible for managing a dedicated network slice, such as the AS 195 illustrated in FIG. 1. However, in other examples, the method 200 may be performed by another device, such as the processor 402 of the system 400 illustrated in FIG. 4. For the sake of example, the method 200 is described as being performed by a processing system.

The method 200 begins in step 202. In step 204, the processing system may receive a report indicating that a mobile device has been lost or stolen.

In one example, the processing system may be part of an application server, operated by a mobile communications service provider (e.g., an operator of a mobile communications network), that is responsible for managing a network slice that is dedicated for protecting and tracking lost and stolen network devices. In one example, the network slice may include a set of network resources that collectively provides an end-to-end network that is tailored to fulfill specific performance requirements for the protection and tracking of lost and stolen mobile devices. For instance, the network slice may be configured to provide high upload and download speeds, low packet loss, encryption for the transmission of sensitive data (e.g., the location of the mobile device), and/or other services specifically designed to facilitate the protection of user data and/or the recovery of the mobile device.

A user of the mobile device may subscribe to the services of a mobile communications service provider and may use the mobile device to access those services. The mobile communications service provider may provide a software application or web portal via which subscribers may report lost or stolen mobile devices. When a user reports a lost or stolen mobile device via the software application or web portal, this report may trigger a notification that is sent to the application server.

In optional step 206 (illustrated in phantom), the processing system may add, in response to the report, the mobile device to a list of lost and stolen mobile devices that is accessible to a plurality of mobile communications service providers.

In one example, the plurality of mobile communications service providers may comprise a plurality of mobile communications network operators. The plurality of mobile communications operators may share access to a list or database that contains identifying information (e.g., international mobile equipment identity, manufacturer, make, model, serial number, subscriber identity module, or the like) of mobile devices that have been reported lost or stolen. This ensures that if a party other than the owner of a lost or stolen mobile device attempts to reactivate the lost or stolen mobile device with a new mobile communications service provider, that attempt will be unsuccessful (e.g., because the new mobile communications service provider will be able to see that the mobile device is lost or stolen).

In optional step 208 (illustrated in phantom), the processing system may send, in response to the report, an instruction to the mobile device that causes the mobile device to delete identifying information from a storage of the mobile device.

In one example, the identifying information may comprise any potentially sensitive information about the user of the mobile device, including identifying information (e.g., phone numbers, addresses, social media accounts, photos and videos, contacts, etc.), financial information (e.g., credit card numbers, bank account numbers, etc.), information about connected devices (e.g., Internet of Things (IoT) devices, connected vehicles, wireless audio devices, wearable smart devices, etc.), and other information. In one example, the information may be deleted from the local storage of the mobile device, but may be stored in network storage that is accessible to the application server (e.g., a database, such as DB 197 of FIG. 1), so that the information can be restored on the mobile device in the event that the mobile device is recovered by the user. However, deleting the information from the local storage until the mobile device is recovered ensures that anyone who may come into possession of the mobile device while the mobile device is considered lost or stolen cannot access or use the information to the detriment of the user.

In step 210, the processing system may send, in response to the report, an instruction to the mobile device that causes the mobile device to connect to a network slice that is dedicated for protecting and tracking lost and stolen mobile devices.

In one example, the network slice may provide access to network resources and services that help to protect and track the mobile device. For instance, as discussed in further detail below, instructions may be sent to the mobile device via the network slice to limit a functionality of the mobile device and/or allow the mobile device's physical location to be tracked. The network slice may provide optimal conditions (e.g., high throughput, low latency, low packet loss, etc.) for transmitting messages containing up to date location information for mobile devices that are lost or stolen, so that the mobile devices can be reliably tracked and the chances of recovering the mobile devices can be improved.

In step 212, the processing system may send, in response to determining that the mobile device has connected to the network slice, an instruction to the mobile device that causes the mobile device to modify a setting of the mobile device to limit a functionality of the mobile device and to permit tracking of the mobile device.

In one example, the instruction may vary depending upon whether the mobile device is reported as lost or stolen and/or whether the mobile device is detected to be powered on or powered off.

For instance, if the mobile device is reported as lost and is determined to be powered on, then the instruction may cause the mobile device to modify one or more settings to reduce one or more functionalities and/or capabilities of the mobile device (e.g., the instruction may instruct the mobile device to enter a power saving mode and to only allow outgoing phone calls but block access to all other functions and applications, including factory resets). If the mobile device is reported to be lost but is determined to be powered off, then the instruction may cause the mobile device to modify one or more settings to facilitate tracking (e.g., the instruction may instruct the mobile device to enter an IoT mode that allows the mobile device to communicate with other network connected devices that are within short range wireless communications range). For instance, IoT mode may cause the mobile device to maintain a reserve of power and to push alerts to other network connected devices announcing that the mobile device is lost.

If the mobile device is reported as stolen and is determined to be powered on, then the instruction may cause the mobile device to modify one or more settings to reduce one or more functionalities and/or capabilities of the mobile device (e.g., the instruction may instruct the mobile device to enter a power saving mode and to only allow outgoing phone calls but block access to all other functions and applications, including factory resets), but also to maintain a reserve of power and to enter an IoT mode so that the mobile device can push alerts to other network connected devices. If the mobile device is reported as stolen and is determined to be powered off, then the instruction may cause the mobile device to modify one or more settings to facilitate tracking (e.g., the instruction may instruct the mobile device to maintain a reserve of power and to enter an IoT mode, but also to block any requests to turn off or disable GPS signals). However, the mobile device will not provide any overt indication that the mobile device's physical location is being shared (e.g., no visible or audible alert when the mobile device pushes messages).

As discussed above, if the instruction causes the mobile device to modify its settings to enter the IoT mode, then the IoT mode may cause the mobile device to push details related to its physical location (e.g., GPS coordinates, photographs, etc.) to nearby network connected devices. The mobile device may also push the details related to the physical location to the network, e.g., to the processing system via the network slice. Pushes to the network may be performed at regular intervals so that the physical location of the mobile device can be tracked continuously, even if the mobile device is in motion (e.g., left behind in a vehicle, being carried by an individual, etc.). In one example, the duration of the regular intervals may vary based on whether the mobile device is reported as lost or stolen (e.g., if reported as stolen, the intervals may be timed to allow for more frequent pushes of location data).

In a further example, the IoT mode may cause the mobile device to capture images of the mobile device's current physical location, which may assist with tracking the mobile device. In one example, the mobile device may capture and send the photographs discreetly (e.g., without generating any sort of visible or audible indication, such as a shutter sound, that might alert anyone to the fact that the mobile device is sharing data).

In a further example, if the mobile device has been reported as stolen, then the IoT mode may further include pushing notifications to other network connected devices within a short range wireless communication distance to alert the other network connected devices to the fact that the mobile device has been reported as stolen.

In one example, the processing system may receive a confirmation from the mobile device that the setting has been modified and may notify the user of the mobile device that the mobile device's settings have been modified to protect the user's data and to facilitate tracking.

In step 214, the processing system may receive, via the network slice, a message from the mobile device indicating a current physical location of the mobile device.

As discussed above, the instruction to modify the setting of the mobile device may cause the mobile device to send data relating to the mobile device's current physical location at regular intervals. The data may include GPS coordinates, photographs captured by the mobile device, or other data. This data may be stored in order to track the physical location of the mobile device over time and potentially facilitate recovery of the mobile device.

In optional step 216 (illustrated in phantom), the processing system may receive a message from another device indicating a current physical location of the mobile device.

As discussed above, in one example, the mobile device may push data to nearby network connected devices if the mobile device is in the IoT mode. The data may include an indication that the mobile device is lost or stolen, as well as an indication of the mobile device's current physical location. A network connected device that is in receipt of data pushed by the mobile device may, in turn, share this data with the processing system. For instance, the data pushed by the mobile device may include a request that the receiving network connected device delivers the data to the processing system. The network connected device may share the data with the processing system in a discreet manner (e.g., without generating any sort of visible or audible alert, and without sharing any identifying information related to the network connected device or its user).

In step 218, the processing system may report the current physical location of the mobile device.

In one example, the processing system may report the current physical location of the mobile device as the most recent location data received in step 214 and/or step 216. The processing system may report the current physical location each time updated physical location data is received, or may report the physical location data at regular intervals based on the most recent data that the processing system has received.

The processing system may report the current physical location to the owner of the mobile device (e.g., if the mobile device is reported as lost) or to law enforcement authorities (e.g., if the mobile device is reported as stolen). In further examples, the current physical location may also be reported to an individual or team associated with the mobile communications service provider, who may assist the user and/or law enforcement in tracking lost and stolen mobile devices. For instance, the mobile communications service provider may include dedicated teams for device recovery, fraud, customer care, and the like who would benefit from access to the information obtained by the processing system.

In step 220, the processing system may determine whether the mobile device has been recovered.

For instance, if the mobile device has been returned to the user, then the user may report (e.g., in the same manner that the user reported the loss or theft of the mobile device in step 204) that the mobile device has been recovered.

If the processing system concludes in step 220 that the mobile device has not been recovered, then the method 200 may return to step 214, and the processing system may proceed as described above to continue receiving messages indicating the current physical location of the mobile device (which may change over time if the mobile device is moving).

Alternatively, if the processing system concludes in step 220 that the mobile device has been recovered, then the method 200 may proceed to step 222. In step 222, the processing system may send, via the network slice, an instruction to the mobile device that causes the mobile device to disconnect from the network slice.

In a further example, the instruction may include an instruction to reverse any modifications made to the settings of the mobile device (e.g., in accordance with step 212) so that normal functionality of the mobile device can be restored and the mobile device does not continue to push location notifications.

In a further example, if the mobile device was added to a list and stolen mobile devices (e.g., per step 206), then the processing system may remove the mobile device from the list.

The method 200 may end in step 224.

Figure 3:
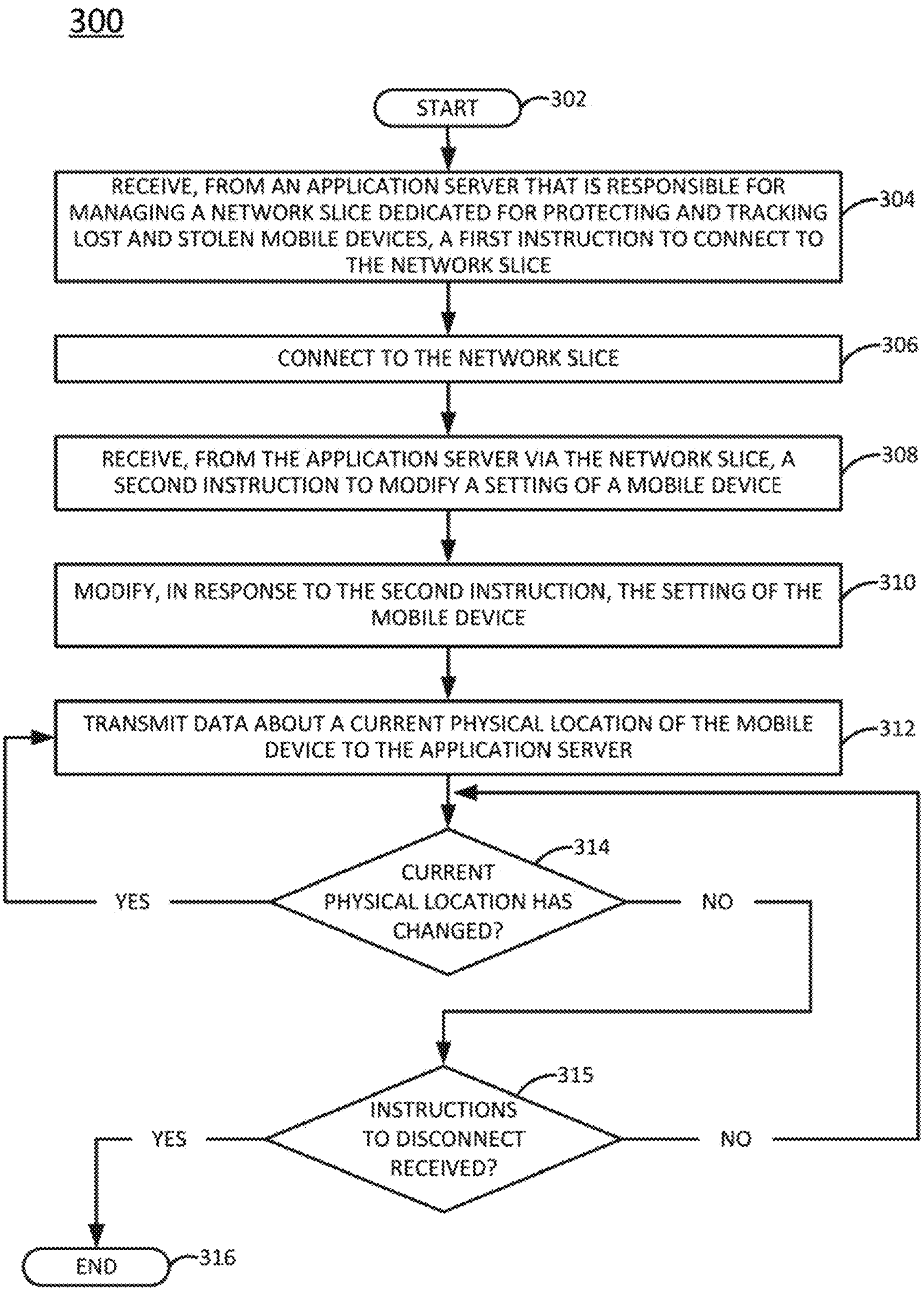
FIG. 3 illustrates a flowchart of an example method for tracking and protecting lost or stolen mobile devices via a dedicated network slice, in accordance with the present disclosure.

To further aid in understanding the present disclosure, FIG. 3 illustrates a flowchart of an example method 300 for tracking and protecting lost or stolen mobile devices via a dedicated network slice, in accordance with the present disclosure. In particular, the method 300 provides a method by which a mobile device that has been reported as lost or stolen may take steps to protect user data and facilitate tracking and recovery. In one example, the method 300 may be performed by mobile device, such as the UE 104 or UE 106 illustrated in FIG. 1. However, in other examples, the method 300 may be performed by another device, such as the processor 402 of the system 400 illustrated in FIG. 4. For the sake of example, the method 300 is described as being performed by a processing system.

The method 300 begins in step 302. In step 304, the processing system may receive, from an application server that is responsible for managing a network slice dedicated for protecting and tracking lost and stolen mobile devices, a first instruction to connect to the network slice.

In one example, the processing system may be part of a mobile device that has been reported as lost or stolen. For instance, a user of the mobile device may report the loss of theft of the mobile device via a software application or web portal provided by a mobile communications service provider (e.g., an operator of a mobile communications network to which the user is subscribed).

In one example, the mobile device may be any device that is capable of connecting to and transmitting communications via a mobile communications network. For instance, the mobile device may be a cellular smart phone, a wearable computing device (e.g., smart glasses, a VR headset or other types of head mounted display, or the like), a laptop computer, a tablet computer, a connected vehicle, or the like.

In step 306, the processing system may connect to the network slice.

In one example, the network slice may include a set of network resources that collectively provides an end-to-end network that is tailored to fulfill specific performance requirements for the protection and tracking of lost and stolen mobile devices. For instance, the network slice may be configured to provide high upload and download speeds, low packet loss, encryption for the transmission of sensitive data (e.g., the location of the mobile device), and/or other services specifically designed to facilitate the protection of user data and the recovery of the mobile device.

In one example, the processing system may connect to the network slice via a virtual handshake (e.g., an exchange of a series of messages between the processing system and the application server, where the result of a successful exchange of the series of messages is the establishment of a secure communications channel or session between the processing system and the application server). The secure session may persist until one of the processing system or the application server sends a message to terminate or close the session.

In step 308, the processing system may receive, from the applications server via the network slice, a second instruction to modify a setting of the mobile device.

In one example, the second instruction may vary depending upon whether the mobile device is reported as lost or stolen and/or whether the mobile device is detected to be powered on or powered off.

For instance, if the mobile device is reported as lost and is determined to be powered on, then the second instruction may cause the processing system to modify one or more settings to reduce one or more functionalities and/or capabilities of the mobile device (e.g., the second instruction may instruct the mobile device to enter a power saving mode and to only allow outgoing phone calls but block access to all other functions and applications, including factory resets). If the mobile device is reported to be lost but is determined to be powered off, then the second instruction may cause the processing system to modify one or more settings to facilitate tracking (e.g., the second instruction may instruct the mobile device to enter an IoT mode that allows the mobile device to communicate with other network connected devices that are within a short range wireless communications range). For instance, the IoT mode may cause the mobile device to maintain a reserve of power and to push alerts to other network connected devices announcing that the mobile device is lost.

If the mobile device is reported as stolen and is determined to be powered on, then the second instruction may cause the processing system to modify one or more settings to reduce one or more functionalities and/or capabilities of the mobile device (e.g., the second instruction may instruct the mobile device to enter a power saving mode and to only allow outgoing phone calls but block access to all other functions and applications, including factory resets), but also to maintain a reserve of power and to enter an IoT mode so that the mobile device can push alerts to other network connected devices. If the mobile device is reported as stolen and is determined to be powered off, then the second instruction may cause the processing system to modify one or more settings to facilitate tracking (e.g., the second instruction may instruct the mobile device to maintain a reserve of power and to enter the IoT mode, but also to block any requests to turn off or disable GPS signals). However, the mobile device will not provide any overt indication that the mobile device's physical location is being shared (e.g., no visible or audible alert when the mobile device pushes messages).

In optional step 310, the processing system may modify, in response to the second instruction, the setting of the mobile device.

That is, the processing system will make any modifications to the mobile device settings that are specified in the second instructions. As discussed above, the precise nature of the modifications may depend on whether the mobile device has been reported as lost or stolen, and whether the mobile device is determined to be powered on or powered off.

In step 312, the processing system may transmit data about a current location of the mobile device to the application server.

As discussed above, if the second instruction causes the processing system to modify the mobile device settings to enter the IoT mode, then the IoT mode may cause the processing system to push details related to the mobile device's physical location (e.g., GPS coordinates, photographs, etc.) to nearby network connected devices. The processing system may also push the details related to the physical location to the network, e.g., to the application server via the network slice. Pushes to the network may be performed at regular intervals so that the physical location of the mobile device can be tracked continuously, even if the mobile device is in motion (e.g., left behind in a vehicle, being carried by an individual, etc.). In one example, the duration of the regular intervals may vary based on whether the mobile device is reported as lost or stolen (e.g., if reported as stolen, the intervals may be timed to allow for more frequent pushes of location data).

In a further example, the IoT mode may cause the processing system to capture images of the mobile device's current physical location, which may assist with tracking the mobile device. In one example, the processing system may capture and send the photographs discreetly (e.g., without generating any sort of visible or audible indication, such as a shutter sound, that might alert anyone to the fact that the mobile device is sharing data).

In a further example, if the mobile device has been reported as stolen, then the IoT mode may further include pushing notifications to other network connected devices within a short range wireless communication distance to alert the other network connected devices to the fact that the mobile device has been reported as stolen.

In one example, the data may be sent to the application server via the network slice, ensuring quick and reliable delivery to the application server.

In step 314, the processing system may determine whether the current physical location of the mobile device has changed.

For instance, the mobile device may be in motion (e.g., left in a vehicle or being carried by a person who is moving). In one example, whenever the current physical location of the mobile device changes by more than a threshold distance (e.g., x feet), the processing system may transmit an update to application server. Alternatively, the processing system may be instructed (e.g., in step 308) to send the current physical location of the mobile device at regular intervals, regardless of whether the physical location has changed.

If the processing system concludes in step 314 that the current physical location of the mobile device has changed (or that an interval for transmitting the current physical location of the mobile device has occurred), then the method 300 may return to step 312 and may proceed as described above to transmit the current physical location of the mobile device to the application server.

If, however, the processing system concludes in step 314 that the current physical location of the mobile device has not changed (or that an interval for transmitting the current physical location of the mobile device has not yet occurred), then the method 300 may proceed to step 315. In step 315, the processing system may determine whether instructions to disconnect from the network slice have been received.

For instance, if the mobile device has been recovered, then the user of the mobile device, the network communications service provider, and/or law enforcement may report the mobile device as having been recovered. In this case, the mobile device may no longer require the protection and tracking provided by the network slice. Thus, when the application server received notification that the mobile device has been recovered, the application server may send the processing system an instruction to disconnect from the network slice.

In further examples, the instruction may further include instructions to restore any settings of the mobile device that were set prior to receiving the second instruction in step 310. In this case the processing system may restore the settings of the mobile device so that full functionality of the mobile device is restored and the processing system will no longer push location messages to other devices and/or to the application server.

The method 300 may end in step 316.

Thus, examples of the present disclosure may be useful in a variety of situations in which a mobile device may become lost or stolen. For instance, examples of the present disclosure may be used to recover a mobile device that a user dropped, left behind in a vehicle, or the like, as well as a mobile device that has been stolen. Further examples of the present disclosure may be used to track mobile devices that are known to be involved in the commission of fraud or other crimes (which could utilize a separate network slice that functions in a similar manner to the network slice described herein). Similar techniques could also be used to track healthcare equipment, automotive parts, and other items.

Although not expressly specified above, one or more steps of the methods 200 or 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or method 300 may be implemented as the system 400. For instance, a user endpoint device (such as might be used to perform the method 300) or an application server (such as might be used to perform the method 200) could be implemented as illustrated in FIG. 4.

As depicted in FIG. 4, the system 400 comprises a hardware processor element 402, a memory 404, a module 405 for tracking and protecting lost or stolen mobile devices via a dedicated network slice, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for tracking and protecting lost or stolen mobile devices via a dedicated network slice may include circuitry and/or logic for performing special purpose functions relating to the tracking of mobile devices and the protection of mobile devices via modifications to functionality and/or data storage. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for tracking and protecting lost or stolen mobile devices via a dedicated network slice (e.g., a software program comprising computer-executable instructions) can be loaded into memory 404 and executed by hardware processor element 402 to implement the steps, functions or operations as discussed above in connection with the example method 200 or example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for tracking and protecting lost or stolen mobile devices via a dedicated network slice (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:

receiving, by a processing system including at least one processor, a report indicating that a mobile device has been lost or stolen;

sending, by the processing system in response to the report, an instruction to the mobile device that causes the mobile device to connect to a network slice that is dedicated for protecting and tracking lost and stolen mobile devices;

sending, by the processing system in response to determining that the mobile device has connected to the network slice, a second instruction to the mobile device that causes the mobile device to modify a setting of the mobile device to limit a functionality of the mobile device and to permit tracking of the mobile device;

receiving, by the processing system via the network slice, a message from the mobile device indicating a current physical location of the mobile device; and reporting, by the processing system, the current physical location of the mobile device.

2. The method of claim 1, wherein the processing system is part of an application server that manages the network slice.

3. The method of claim 2, wherein the network slice comprises a slice of a mobile communications network, and a user of the mobile device is subscribed to a service provided by an operator of the mobile communications network.

4. The method of claim 3, wherein the operator of the mobile communications network provides a software application via which the user submits the report.

5. The method of claim 1, wherein the modifying the setting causes the mobile device to enter a power saving mode.

6. The method of claim 1, wherein the modifying the setting blocks access to at least one functionality of the mobile device.

7. The method of claim 1, wherein the modifying the setting prevents a factory reset of the mobile device.

8. The method of claim 1, wherein the modifying the setting causes the mobile device to send the message indicating the current physical location of the mobile device at a regular interval.

9. The method of claim 8, wherein the message include at least one of: global positioning system coordinates corresponding to the current physical location or a photograph taken at the current physical location.

10. The method of claim 1, wherein the modifying the setting causes the mobile device to share the current physical location with another device other than the processing system.

11. The method of claim 10, further comprising:

receiving, by the processing system, a second message from the another device indicating the current physical location of the mobile device.

12. The method of claim 1, wherein the modifying the setting causes the mobile device to prevent a global positioning system of the mobile device from being disabled.

13. The method of claim 1, wherein the reporting reports the current physical location to at least one of: an owner of the mobile device, an operator of a mobile communications network to which the mobile device is subscribed, or a law enforcement agency.

14. The method of claim 1, further comprising:

sending, by the processing system in response to a determination that the mobile device has been recovered, a third instruction to the mobile device to disconnect from the network slice.

15. The method of claim 14, wherein the third instruction to disconnect from the network slice includes a further instruction to restore the setting of the mobile device to a state of the setting prior to the setting being modified.

16. The method of claim 1, further comprising:

sending, by the processing system in response to the report, an instruction to the mobile device that causes the mobile device to delete identifying information from a storage of the mobile device.

17. The method of claim 16, wherein the identifying information comprises at least one of: a phone number, an address, a social media account, a photo, a video, a contact, a credit card number, a bank account number, information about a connected device, or information about an application subscription.

18. The method of claim 1, further comprising:

adding, by the processing system in response to the report, an identification of the mobile device to a list of lost and stolen mobile devices that is accessible to a plurality of mobile communications service providers.

19. A non-transitory computer-readable medium storing instructions which, when executed by a processing system including at least one processor, cause the processing system to perform operations, the operations comprising:

receiving a report indicating that a mobile device has been lost or stolen;

sending, in response to the report, an instruction to the mobile device that causes the mobile device to connect to a network slice that is dedicated for protecting and tracking lost and stolen mobile devices;

sending, in response to determining that the mobile device has connected to the network slice, a second instruction to the mobile device that causes the mobile device to modify a setting of the mobile device to limit a functionality of the mobile device and to permit tracking of the mobile device;

receiving, via the network slice, a message from the mobile device indicating a current physical location of the mobile device; and reporting the current physical location of the mobile device.

20. A device comprising:

a processing system including at least one processor; and a computer-readable medium storing instructions which, when executed by the processing system, cause the processing system to perform operations, the operations comprising:

receiving a report indicating that a mobile device has been lost or stolen;

sending, in response to the report, an instruction to the mobile device that causes the mobile device to connect to a network slice that is dedicated for protecting and tracking lost and stolen mobile devices;

sending, in response to determining that the mobile device has connected to the network slice, a second instruction to the mobile device that causes the mobile device to modify a setting of the mobile device to limit a functionality of the mobile device and to permit tracking of the mobile device;

receiving, via the network slice, a message from the mobile device indicating a current physical location of the mobile device; and reporting the current physical location of the mobile device.

* * * * *